US011237851B1

(12) United States Patent
Thomas et al.

(10) Patent No.: US 11,237,851 B1
(45) Date of Patent: Feb. 1, 2022

(54) SIMULTANEOUS GENERATION OF DIFFERENTLY INTERACTIVE DEVICE MENUS AUTOMATICALLY FROM AN INITIAL DEVICE MENU

(71) Applicant: Xerox Corporation, Norwalk, CT (US)

(72) Inventors: Timothy D. Thomas, Fairport, NY (US); Giuseppe Pandolfo, Rochester, NY (US); James P. Russell, Penn Yan, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/928,048

(22) Filed: Jul. 14, 2020

(51) Int. Cl.
*G06F 9/451* (2018.01)
*G06F 3/12* (2006.01)

(52) U.S. Cl.
CPC ............ *G06F 9/451* (2018.02); *G06F 3/1203* (2013.01); *G06F 3/1253* (2013.01); *G06F 3/1272* (2013.01); *G06F 3/1288* (2013.01)

(58) Field of Classification Search
None
See application file for complete search history.

(56) References Cited

U.S. PATENT DOCUMENTS

| 7,792,814 | B2 | 9/2010 | Cohen |
| 8,161,160 | B2 | 4/2012 | London et al. |
| 8,739,074 | B2 | 5/2014 | Kinoshita |
| 9,030,611 | B2 | 5/2015 | Bae |
| 2002/0083121 | A1* | 6/2002 | Chang ................. G06Q 20/327 709/201 |
| 2006/0155717 | A1 | 7/2006 | Davis et al. |
| 2006/0178898 | A1 | 8/2006 | Habibi |
| 2017/0019546 | A1 | 1/2017 | Tse et al. |

FOREIGN PATENT DOCUMENTS

WO    WO-2005043315 A2 *  5/2005  ......... H04N 1/00233

OTHER PUBLICATIONS

OctoPrint.org, at least see pp. 1 and 2. (Year: 2020).*

* cited by examiner

*Primary Examiner* — William L Bashore
*Assistant Examiner* — Gabriel Mercado
(74) *Attorney, Agent, or Firm* — Gibb & Riley, LLC (57) ABSTRACT

Various methods and devices control operating components using a device operation program, control a user interface device using a menu program to display a device menu having menu options, receive menu choices in response to the device menu, control the operating components based on the menu choices, and convert the device menu into a browser-compatible menu compatible with internet protocols using the menu reproduction program. The browser-compatible menu has the same menu options included in the device menu. These methods and devices provide the browser-compatible menu to external devices using a wired or wireless communications device, receive external device input from the external devices responding to the browser-compatible menu, supply, from the wired or wireless communications device, the external device input to the device operation program and control the operating components by the device operation program based on the external device input.

14 Claims, 5 Drawing Sheets

SIMULTANEOUS GENERATION OF DIFFERENTLY INTERACTIVE DEVICE MENUS AUTOMATICALLY FROM AN INITIAL DEVICE MENU

BACKGROUND

Systems and methods herein generally relate to device menus presented on user interfaces and more particularly to the generation of device menus that user interacts with differently (e.g., differently interactive device menus).

In an effort to increase usability of machines, device manufacturers include more than one type of device menu (differently interactive device menus) to allow users with different abilities to use their machines more easily. For example, some user interfaces are designed to be used by individuals with normal vision (e.g., at least correctable to 20/20) while other user interfaces are designed to be used by individuals with impaired vision. Other users may have different limitations, including attention restrictions, physical manipulation restrictions, etc. That can be accommodated using differently interactive device menus. Typically, additional user interfaces are generated by creating a specialized and very limited user interface version that only runs on an external user-operated devise such tablets, smartphones, etc. The additional device menu versions can use the external device's native text-to-speech and gesture recognition to allow visually or physically impaired users to remotely interface with the machine through the external device.

One issue with this approach is that the remote versions of the device menus are separately created and coded elements that require utilization of multiple code bases, present just a limited subset of functionality on the remote versions of the device menus, and require continual updating of all device menu versions as the native functionality changes. In other words, maintaining multiple device menu versions can increase the amount of work and time needed for updates when functionality changes because each different device menu version needs to be updated and maintained separately. Additionally, the different device menu versions may require that updates be made in different programming languages and the different user device menu versions may not always be identical, which can result in some features being omitted and unavailable to certain types of users.

SUMMARY

Various methods herein control operating components of a machine using a device operation program executable by a processor device within the machine. A device menu (having menu options) that is used to control such operating components is created and maintained using a menu program that is executable by the processor. At various times this device menu may be manually or automatically updated.

These methods control a user interface device using the menu program to display the device menu on the user interface device. Because of historical factors, machine restrictions, software restrictions, etc., the menu program used to generate and display the device menu may or may not be compatible with internet protocols. In response to the device menu, these methods receive back menu choices input by the user to the user interface device. With this input, methods herein control the operating components (through operation of the device operation program) based on such menu choices.

These methods can also establish wired or wireless communications with external devices using a wired or wireless communications device. These methods use a menu reproduction program to convert the device menu into a browser-compatible menu that is compatible with internet protocols, if needed. The menu reproduction program can optionally be adapted to convert at least one of the device messages into what is referred to as an alert (asynchronous) message. Such an alert message contains features causing the external device to present the alert message in a different format relative to presentation formats of the other text in the browser-compatible menu. The browser-compatible menu has all the same menu options that are included in the device menu, and therefore the browser-compatible menu includes all the same content as the device menu. Additionally, providing the browser-compatible menu to the external device allows the user to choose their form of both presentation (GUI, voice, haptic feedback, . . . ) and input (menu selection, gestures).

The wired or wireless communications device is used by the methods herein to provide the browser-compatible menu to external devices. The browser-compatible menu provided to one of the external devices can be automatically generated in methods herein by the menu reproduction program only after the wired or wireless communications device has established wired or wireless communications with the first external device. Alternatively, these methods can automatically generate the browser-compatible menu (using the menu reproduction program) after each and every change to the device menu.

In response to the browser-compatible menu, with methods herein, the wired or wireless communications device receives back external device input from the external devices based on users interacting with the external devices when responding to the browser-compatible menu provided. In these methods, the wired or wireless communications device supplies this received external device input to the device operation program. Therefore, these methods control the machine's operating components, using the device operation program, based on the external device input.

Apparatuses (devices) herein include (among other components) operating components (printers, scanners, sheet feeders, sorters, etc.) that are operatively connected to a processor. An electronic memory device, a user interface device, and a wired or wireless communications device are also operatively connected to the processor. The electronic memory device maintains a menu program executable by the processor device, a menu reproduction program executable by the processor device, and a device operation program executable by the processor device to control the operating components.

The menu program is adapted to control the user interface device, through the processor, to display a device menu having menu options. The device menu may or may not be compatible with internet protocols. The device operation program controls the operating components based on menu choices supplied by the user in response to the device menu presented on the user interface device. The menu reproduction program is adapted to convert the device menu into a browser-compatible menu that is compatible with internet protocols. The menu reproduction program may also optionally be adapted to convert at least one of the device messages into an alert message. Such an alert message contains features causing the external device to present the alert message in a different format relative to presentation formats of the other text in the browser-compatible menu. The browser-compatible menu has all the same menu options and elements for receiving input that are included in the device menu and therefore all the same content as the device menu.

The wired or wireless communications device is also adapted to establish wired or wireless communications with the external devices. The wired or wireless communications device is adapted to provide the browser-compatible menu to external devices. More specifically, the user interface device includes a display screen and the device menu is only displayed on that display screen, and the browser-compatible menu is displayed only on display screens of the external devices. Also, the browser-compatible menu provided to one of the external devices is only generated by the menu reproduction program after the wired or wireless communications device has established wired or wireless communications with that external device. Alternatively, the browser-compatible menu can be generated by the menu reproduction program only after each and every change to the device menu.

The wired or wireless communications device is adapted to receive external device input back from the external devices that are responding to the browser-compatible menu. The wired or wireless communications device is further adapted to supply this external device input to the device operation program to control the operating components.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, maintaining multiple device menu versions for users with different abilities can increase the amount of work and time needed for updates when functionality changes because each different version of the user interface needs to be updated separately. Additionally, the different device menu versions may require that updates be made in different programming languages and the different user interfaces may not always be identical, which can result in some features being omitted and unavailable to certain types of users. Therefore, the systems and methods herein automatically generate differently interactive device menus (device menu versions that users interact with differently) from a single initial device menu.

In one example, many specialized or general-purpose computerized portable devices (e.g., tablets, smart phones, personal digital assistants (PDAs), etc.) natively include a full function set for allowing users with visual, physical, or attention impairments to interact with internet protocols and apps that are commonly used with such portable devices. Therefore, these functions sets operate through inputs that must be formatted in programming languages of the portable devices, which are generally the programming languages of Internet browsers and apps.

For simplification of discussion herein, these languages are generically identified using the arbitrary shorthand phrase "browser-compatible languages." While such browser-compatible languages have changed from time to time and will change in the future, some currently commonly used browser-compatible languages include, but are not limited to, extensible markup language (XML®), XML user interface language (XUL®), hypertext markup language (HTML®), cascading style sheets (CSS®), Java®, JavaScript®, C++®, Objective-C®, Python®, personal homepage (PHP®), Js®, Ruby®, Kotlin®, etc. As used herein, browser-compatible languages are not limited to the previous exemplary list but include any language, whether currently known or developed in the future, that would be used by portable devices to assist user communications.

Such function sets provide enhanced accessibility features that can provide additional visual stimulation, recognize a user's gestures or touch interaction with a touch surface (e.g., trackpad, touchscreen, etc.), etc. These features help some users navigate and select user interface components, such as menu selections. For example, these function sets can recognize special left→right, right→left, double-tap, triple-tap gestures as input to a touch surface to have specific interface meaning.

Some specialized function sets provide output audio (e.g., words, sounds, etc.) to audibly present the features and menu choices within the user interface, in order to assist users that may not be able to visually view the user interface. In one example, the text on the user interface can be converted to speech (using any commonly available text-to-speech application) when the user interacts with the corresponding portion of the touch surface. Other specialized function sets can use haptic feedback to allow visually impaired users to "feel" portions of the touch surface that corresponding to aspects of the visual user interface. Future user interfaces of external devices are anticipated to provide user-programmable interaction criteria, and the generic browser-compatible menus provided by embodiments herein will allow the users operating such anticipated external devices to create customized interactions to suite their individual needs.

Production machines that include embedded user interfaces (e.g., fixed on or physically connected to the exterior of the production machine) do not commonly utilize browser-compatible languages and cannot perform these specialized function sets. In one example, a machine's embedded user interface maybe generally be limited to a touchscreen or a display-only screen accompanied by a hard buttons. Some examples of production machines can include printing devices, scanning devices, sorting devices, stacking devices, sheet feeding devices, book making equipment, automated cutting equipment, automated punching equipment, multi-function devices that perform many of the previous functions, robotic arms, packaging equipment, etc. Production machines are distinguished from external devices by being larger and less portable than external devices. In addition, the primary function of productions machine is to produce or alter a physical product or device, while the primary function of external device is general computing including communications, entertainment, and information processing.

Production machines may not utilize browser-compatible languages because of historical reasons (e.g., browser-compatible languages may not have been available when the internal communication systems within such production machines were established- and such systems have only been updated over time, and not fully replaced), operational reasons (e.g., browser-compatible languages may not be compatible with the languages production component control systems utilize), lack of need (e.g., user interfaces embedded on the exterior of production machines can be relatively simple and lack the need for the sophistication provided with programming languages), etc.

Therefore, the device menus within the embedded user interface of the production machines may or may not be simply output to the portable devices, depending upon the language differences between the two. In order to enhance accessibility for the production machines, a separate accessibility browser-compatible menu is often created and maintained, potentially in a browser-compatible language. As noted above, the preparation of this separately accessible browser-compatible menu is time consuming, expensive, and the browser-compatible menu needs to be updated separately and may not include all the features of the embedded user interface.

In order to address these issues, the methods and devices herein automatically convert the information within the device menu of the embedded user interface into a browser-compatible language (e.g., potentially presented as a web page, such as a web page (https://hostname/accessible)) locally accessible from the production machine that can be utilized by the portable devices. In other words, the methods and devices herein have the ability to convert the device menu into a browser-compatible menu that is compatible with internet protocols when such is necessary.

Additionally, the methods and devices herein can also automatically convert some of the data from the device menu into alert messages that are presented to the user in different formats relative to the remainder of the browser-compatible menu to ensure that users with accessibility issues are properly notified of items within the browser-compatible menu. For example, if certain data is identified as falling within (asynchronous) classification (e.g., system malfunction messages, jam messages, low supply (low paper, low toner, etc.) messages, attention messages, caution messages, warning messages, interruption messages, etc.) this data is not presented in the same way as the other text in the browser-compatible menu, but instead alert messages are presented in a relatively more prominent manner to ensure that the user is made aware of the message.

Some ways in which the alert messages are presented in a relatively more prominent manner includes instructing the portable device to audibly present the alert messages (e.g., using text-to-speech) through a speaker of the portable device, providing vibratory or haptic feedback from the portable device, locating the touch areas for interacting with the alert message in more prominent locations on the touch surface of the portable device to increase the likelihood of user interaction with the alert messages, etc. Further, the audible and vibratory output relating to the alert messages can be periodically repeated to help ensure that the user receives the alert messages.

In some examples, the device menu of the production device is written using Java, standard widget toolkit (SWT®), Swing®, etc., and each time a navigation is performed the entire interface can easily be exported as an XML® document to be used in this solution.

Figure 1:
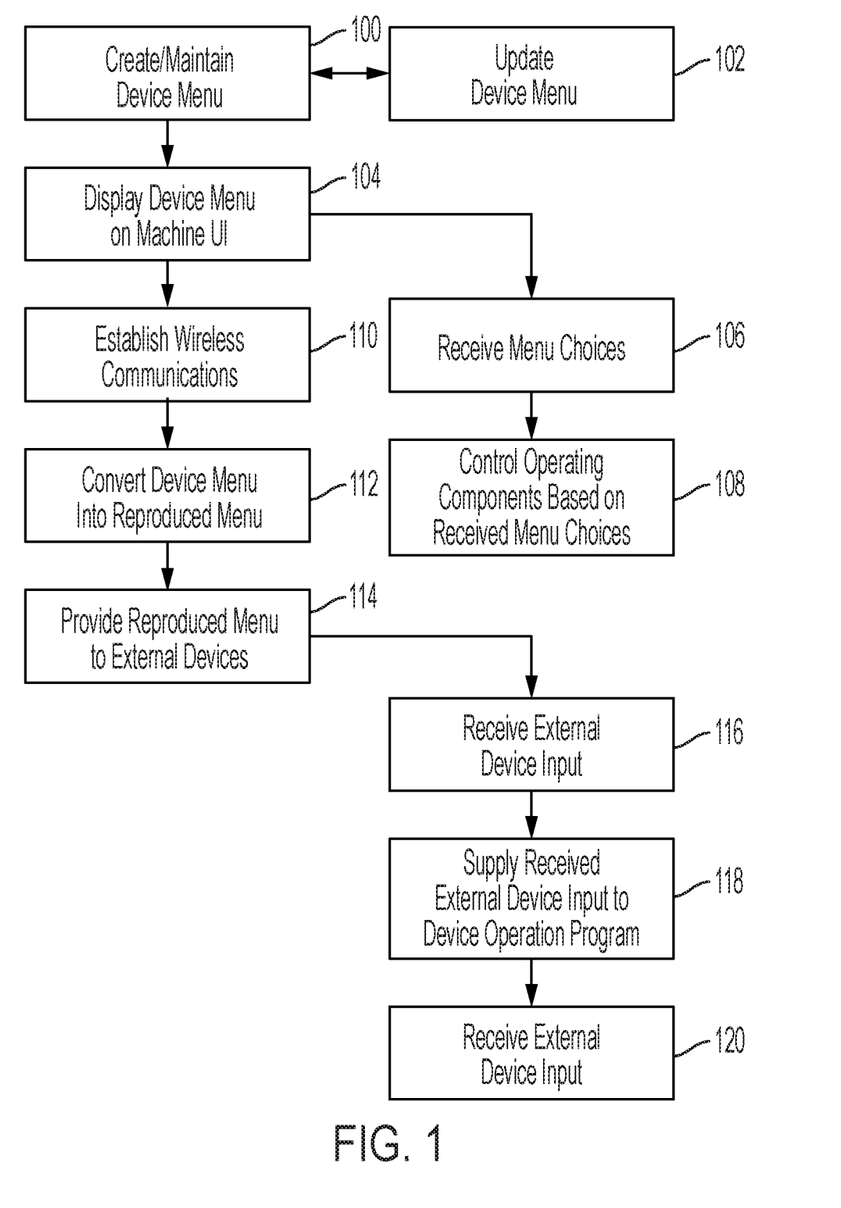
FIG. 1 is a flow diagram of various methods herein.

FIG. 1 is flowchart illustrating exemplary methods herein. In item 100, a device menu (having menu options) that is used to control operating components of a machine is created and maintained using a menu program that is executable by a processor of the machine. At various times this device menu may be manually or automatically updated in item 102, as shown by the double-headed arrow between items 100 and 102.

In item 104, these methods control a user interface device of the machine using the menu program to display the device menu on the user interface device of the machine. Because of historical factors, machine restrictions, software restrictions, etc., the menu program used to generate (100) and display (104) the device menu may not be compatible with internet protocols. In response to the device menu provided in item 104, these methods receive back menu choices input by the user to the user interface device in item 106. With this input, in item 108 methods herein control the operating components of the machine based on such menu choices received in item 106. Specifically, in item 106 these methods control operating components of the machine using a device operation program executable by the processor device.

These methods can also establish wired or wireless communications with external devices using a wired or wireless communications device in item 110. For example, the machine can open a web socket for two-way communication with the external device. In item 112, if needed, these methods use a menu reproduction program to convert the device menu into a browser-compatible menu that is compatible with internet protocols (e.g., such as the browser-compatible languages discussed above). The browser-compatible menu generated in item 112 has all the same menu options that are included in the device menu generated in item 100, and therefore the browser-compatible menu has all the same content as the device menu generated in item 100.

The conversion of the device menu by the menu reproduction program is fully automatic and can be performed each time before the browser-compatible menu is provided to an external device or whenever the device menu is changed. The device menus are usually of relatively somewhat lower complexity because each device menu page is generally limited in size, the device menu usually contains static text-only menu options, the links between different pages of the device menu are generally links to single pages without complex logical page-linking constraints. All this combines to make the automated conversion of the device menu to a browser-compatible menu straightforward and one that does not substantially tax the computing resources of the corresponding production machine.

The menu reproduction program is adapted to automatically convert at least one of the device messages into an alert (asynchronous) message in item 112, when needed. Such an "alert message" contains features causing the external device to present the alert message in a different format relative to presentation formats of the other text in the browser-compatible menu. Also, the alert message can be presented repeatedly (periodically) until the issue described by the alert message is addressed by the user (e.g., until a paper jam is cleared by the user) or until the alert message is disabled.

For example, as described above, some user interfaces for the visually impaired cause text within different locations of a web page (e.g., web page, etc., that is capable of being read by an Internet browser) to be output as audible speech from a speaker of the external device using text-to-speech. For example, the speech is output when the user touches a portion of a touch surface of the external device that corresponds to one of the text elements within the web page in the browser. However, if the text relates to an issue of high importance or an issue that needs immediate attention (e.g., machine malfunction, etc.) the visually impaired user may not become aware of this important text unless/until they randomly touch the portion of the touch surface that corresponds to the important text.

In order to address this situation, with methods and devices herein, if the menu reproduction program identifies text as being the type that should be classified as an alert (asynchronous) message, the alert message is given "features" (e.g., presentation/display instructions of alert messages) that cause the external device to immediately output the text of the alert message as audible speech from a speaker of the external device as soon as the external device receives the browser-compatible menu, without waiting for the user to touch the portion of the touch surface that corresponds to the alert message.

In other examples of ways that these features of alert messages cause the external device to present the alert messages in a different format (relative to presentation formats of the other text in the browser-compatible menu) for users with minor visual or attention deficit constraints, the alert messages may be presented visually on a display screen of the external device in larger fonts, in a flashing or blinking manner (e.g., repeatedly appearing/disappearing or turning on/off), or in a potentially user-customized way that is in their presentation format of choice. This flashing or blinking of the alert message can occur simultaneously while the text is spoken through the speaker of the external device. Further, the external devices can be made to cause one or more lights to flash through the external device's lights, or buzzers or bells to sound through the external device's speaker, in coordination with the flashing or blinking of the alert messages (as controlled by the features of the alert messages).

Additionally, for external devices that include haptic feedback mechanisms, different vibrational patterns and/or vibrational locations can be provided to the user to direct the user's attention to the text of the alert message. While some ways in which the format of the alert messages may differ relative to the other text within the browser-compatible menu are presented here, those ordinarily skilled in the art would understand that other mechanisms and features of the external device could be used to bring the alert messages to the attention of the user of the external device to overcome any accessibility issues the user may have.

Therefore, the alert messages generated by the menu reproduction program (that are sometimes referred to as asynchronous notifications or push notifications) include features that cause the alert messages to be immediately presented to the user of the external device in their presentation format of choice without waiting for the user to interact with the external device. This helps keep messages that would be easily visually recognized in the device menu by users without visual impairments to also be easily recognized by users who have accessibility issues, when interacting with the machine through the accessibility features of external devices.

The menu reproduction program identifies text within the device menu as being the type that should be classified as an alert (asynchronous) message, based on many different factors including message importance, immediacy, job interruption potential, etc. Therefore, the menu reproduction program distinguishes between "status" and "fault" conditions and classifies text relating to fault conditions as alert messages. For example, text that contains specific keywords (e.g., "malfunction," "jam," "attention," "caution," "warning," "interruption," etc.) can be classified as alert messages. Additionally, text presented in the device menu in relatively large fonts (relative to other text in the device menu), text presented in bold in the device menu, text followed by an exclamation point in the device menu, etc., can also be classified as alert messages. While some are mentioned here, many other methodologies can be used to classified text within the device menu as alert messages, such as analysis of metadata to identify/classify the messages, etc.

The wired or wireless communications device is used by the methods herein to provide the browser-compatible menu to external devices in item 114. For example, the wired or wireless communications devices can provide a web page (https://hostname/accessible)) that is locally accessible through the web socket created by the wired or wireless communications device with the external device. The browser-compatible menu provided to one of the external devices in item 114 can be generated in methods herein by the menu reproduction program in item 112 only after the wired or wireless communications device has established wired or wireless communications with the first external device in item 110, to make the browser-compatible menu identical in content and features as the device menu. Alternatively, these methods can generate the browser-compatible menu (using the menu reproduction program) in item 112 only after each and every change to the device menu made in item 102, to limit the number of times that the menu reproduction program needs to generate an additional browser-compatible menu.

In response to the browser-compatible menu, with methods herein, in item 116 the wired or wireless communications device receives back external device input from the external devices based on users interacting with the external devices when responding to the browser-compatible menu provided in item 114. In these methods, the wired or wireless communications device supplies this received external device input to the device operation program in item 118. Therefore, in item 120 these methods control the operating components of the production machine, using the device operation program, based on the external device input.

Figure 2:
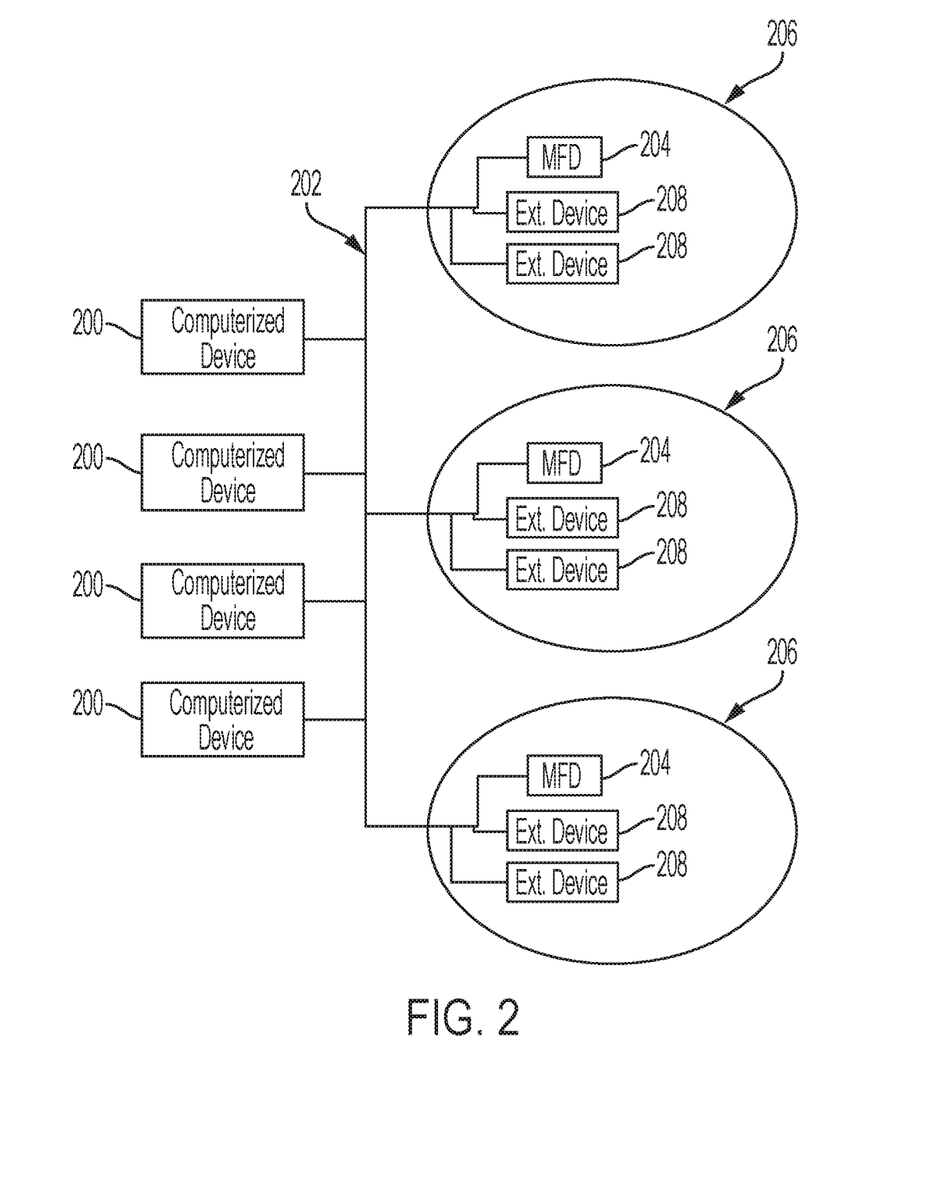
FIG. 2 is a schematic diagram illustrating systems herein.

As shown in FIG. 2, exemplary systems and methods herein include various computerized devices 200, 204, 208 located at various different physical locations 206. The computerized devices can include print servers 200, printing devices (multi-function devices (MFDs)) 204, external devices 208, etc., and are in communication (operatively connected to one another) by way of a local or wide area (wired or wired or wireless) networks 202. In one example, users with accessibility issues may operate and control the printing devices 204 by using the browser-compatible menus supply to the external devices 208. The browser-compatible menus may be generated by the printing devices 204 or by the print servers 200, and the browser-compatible menus may be directly or in directly supplied to the external devices 208 locally or through the network 202.

Figure 3:
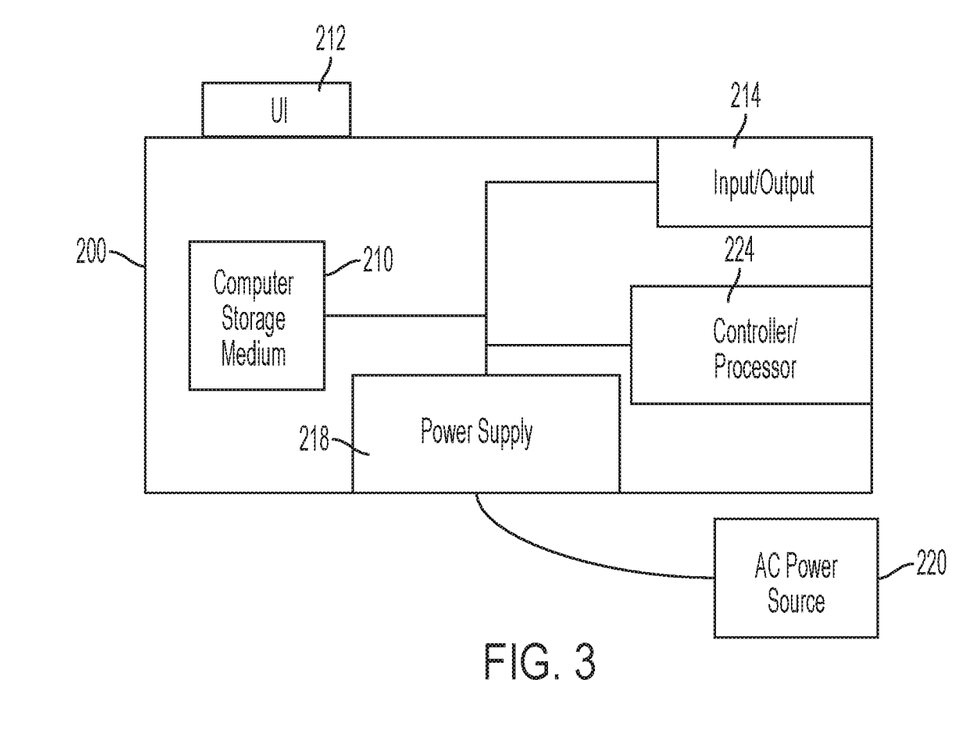
FIG. 3 is a schematic diagram illustrating devices herein.

FIG. 3 illustrates a computerized device 200, which can be used with systems and methods herein and can generically comprise, for example, a print server, a personal computer, a portable computing device, an external device, etc. The computerized device 200 includes a controller/tangible processor 224 and a wired and/or wireless communications port (input/output) 214 operatively connected to the tangible processor 224 and to the computerized network 202 external to the computerized device 200. Also, the computerized device 200 can include at least one accessory functional component, such as a user interface (UI) assembly 212. The user may receive messages, instructions, and menu options from, and enter instructions through, the user interface or control panel 212. Further, the user interface 212 is intended to illustrate user interfaces of production machines as well as more user accessible user interfaces of external devices.

The input/output device 214 is used for communications to and from the computerized device 200 and comprises a wired device or wireless device (of any form, whether currently known or developed in the future). The tangible processor 224 controls the various actions of the computerized device. A non-transitory, tangible, computer storage medium device 210 (which can be optical, magnetic, capacitor based, etc., and is different from a transitory signal) is readable by the tangible processor 224 and stores instructions that the tangible processor 224 executes to allow the computerized device to perform its various functions, such as those described herein. Thus, as shown in FIG. 3, a body housing has one or more functional/production operating components that operate on power supplied from an alternating current (AC) source 220 by the power supply 218. The power supply 218 can comprise a common power conversion unit, power storage element (e.g., a battery, etc.), etc.

Figure 4:
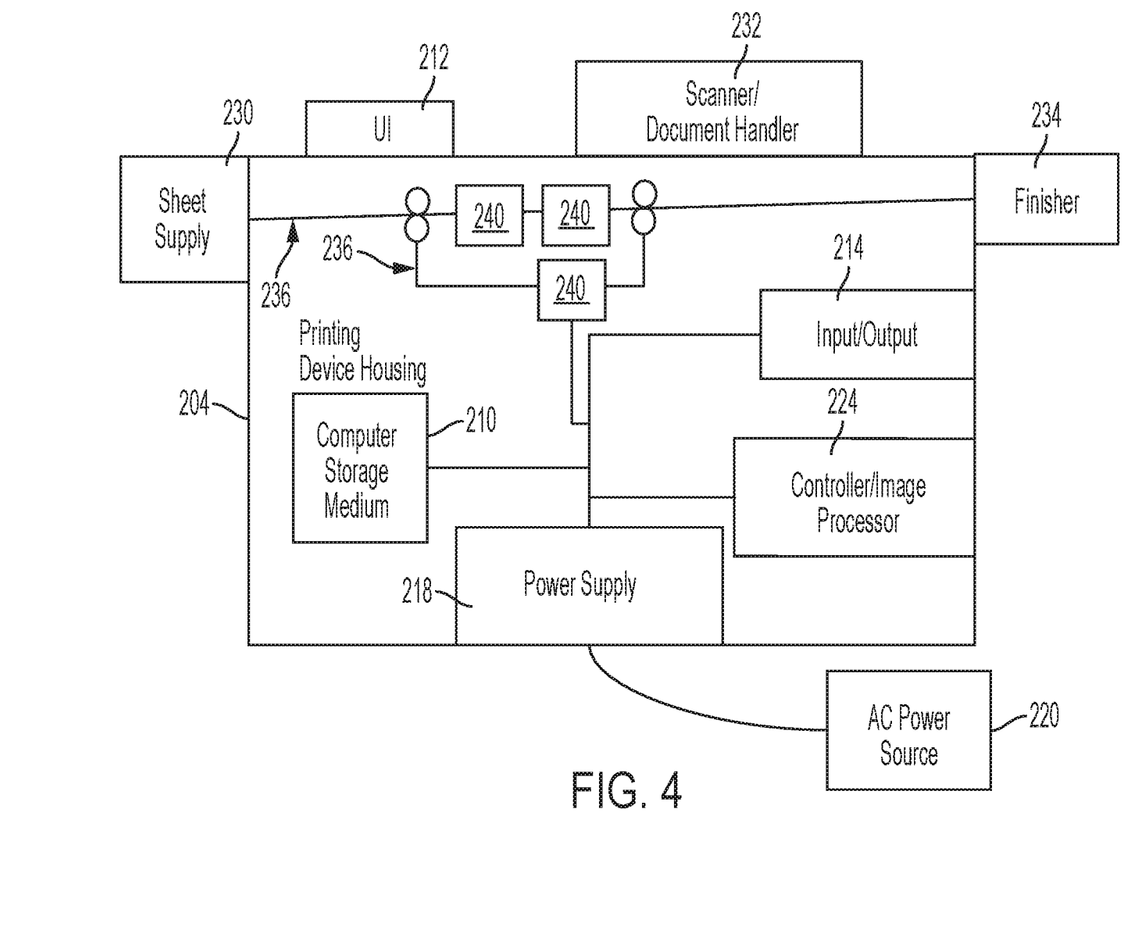
FIG. 4 is a schematic diagram illustrating devices herein.

FIG. 4 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engine(s)) 240 operatively connected to a specialized image processor 224 (that may be different from a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can stack, fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies a marking material (toner, inks, etc.) to continuous media or sheets of media, whether currently known or developed in the future and can include, for example, devices that use a photoreceptor belt or an intermediate transfer belt, or devices that print directly to print media (e.g., inkjet printers, ribbon-based contact printers, etc.).

Figure 5:
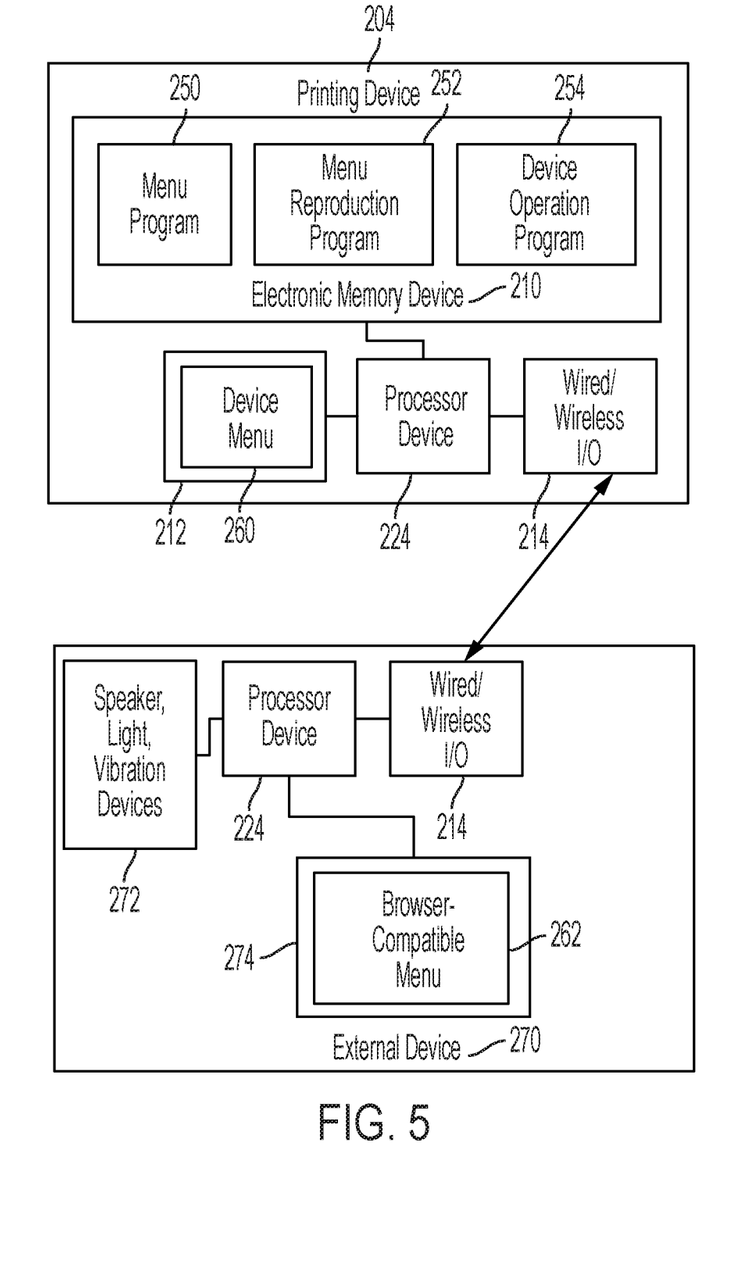
FIG. 5 is a schematic diagram illustrating components of devices herein.

FIG. 5 illustrates some specific components of exemplary devices herein. As noted above, apparatuses (devices) herein include operating production components (printing engines 240, scanners 232, sheet feeders 236, sorters 234, etc.) operatively connected to a processor 224. An electronic memory device 210, a user interface device 212, and a wired/wired or wireless communications device 214 are also operatively connected to the processor 224. The electronic memory device 210 maintains a menu program 250 executable by the processor 224, a menu reproduction program 252 executable by the processor 224, and a device operation program 254 executable by the processor 224 to control the operating components (Note, similar elements could be included within the computerized device 200 shown in FIG. 3 and it is intended that the drawings illustrate the same).

The menu program 250 is adapted to control the user interface device 212, through the processor 224, to display a device menu 260 having menu options. The device menu 260 may not be compatible with internet protocols. The device operation program 254 controls the operating components based on menu choices supplied by the user in response to the device menu 260 presented on the user interface device 212. The menu reproduction program 252 is adapted to convert the device menu 260 into a browser-compatible menu 262 that is compatible with internet protocols.

The wired or wireless communications device 214 is adapted to provide the browser-compatible menu 262 to external devices 270, one of which is shown in FIG. 5. The external devices 270 can each include many components similar to the printing device 204, including a processor device 224, a wired or wireless input output device 214, a user interface 274, and various additional devices such as speaker, light, and vibration devices (all of which are identified using identification number 272 for compactness). The user interface device 212 of the printing device 204 includes a display screen and the device menu 260 is only displayed on that display screen, and the browser-compatible menu 262 is displayed only on display screens of the user interface 274 of the external device 270.

As noted above, the menu reproduction program 252 is adapted to convert at least one of the device messages into an alert (asynchronous) message. Such an alert message contains features causing the external device 270 to present the alert message in a different format relative to presentation formats of the other text in the browser-compatible menu 262. The browser-compatible menu 262 has all the same menu options and elements for receiving input that are included in the device menu 260 and all the same content as the device menu 260.

The wired or wireless communications device 214 is adapted to receive back external device input from the external devices 270 that are responding to the browser-compatible menu 262. The wired or wireless communications device 214 is further adapted to supply this external device input to the device operation program 254 to control the operating components.

The wired or wireless communications device 214 of the printing device 204 is also adapted to establish wired or wireless communications with the external devices 270. Further, the browser-compatible menu 262 provided to one of the external devices 270 may only be generated by the menu reproduction program 252 after the wired or wireless communications device 214 has established wired or wireless communications with that external device 270. Alternatively, the browser-compatible menu 262 can be generated by the menu reproduction program 252 only after each and every change to the device menu 260.

In the drawings the same identification number represents the same or a similar type of device or component and the reuse of such identification numbers avoids unnecessary and redundant discussion of similarly functioning components. While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicant does not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

The various sets of instructions that are executed by a computerized processor to perform the methods described herein can be any form of computerized application, such as an API, a platform API workflow program, a specialty application, etc., all of which are referred to herein simply as "application" for shorthand.

Further, the terms automated or automatically mean that once a process is started (by a machine or a user), one or more machines perform the process without further input from any user. Additionally, terms such as "adapted to" mean that a device is specifically designed to have specialized internal or external components that automatically perform a specific operation or function at a specific point in the processing described herein, where such specialized components are physically shaped and positioned to perform the specified operation/function at the processing point indicated herein (potentially without any operator input or action). In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A device comprising:
    a processor;
    operating components operatively connected to the processor;
    a user interface device operatively connected to the processor;
    a menu program adapted to control the user interface device, through the processor, to display a device menu controlling the operating components, wherein the device menu includes user-selectable menu choices displayed on the user interface device, and wherein the device menu is not compatible with internet protocols;
    a wired or wireless communications device operatively connected to the processor; and
    a menu reproduction program adapted to convert the device menu from being not compatible with internet protocols into a browser-compatible menu compatible with internet protocols, wherein the browser-compatible menu is only generated by the menu reproduction program after each functionality update to the device, wherein each of the functionality updates results in a function set change or a change to the user-selectable menu choices displayed on the user interface device, wherein the wired or wireless communications device is adapted to provide the browser-compatible menu to external devices, wherein the wired or wireless communications device is adapted to receive external device input from the external devices responding to the browser-compatible menu, and wherein the wired or wireless communications device is adapted to supply the external device input to the processor to operate the operating components.

2. The device according claim 1, wherein the browser-compatible menu has the same content as the device menu.

3. The device according claim 1, wherein the wired or wireless communications device is adapted to establish wired or wireless communications with the external devices, and wherein the browser-compatible menu provided to a first external device of the external devices is generated by the menu reproduction program after the wired or wireless communications device has established wired or wireless communications with the first external device.

4. The device according claim 1, wherein the user interface device includes a display screen and the device menu is displayed on the display screen, and wherein the browser-compatible menu is displayed by the external devices.

5. The device according claim 1, wherein the menu reproduction program is adapted to convert the device menu into the browser-compatible menu in the form of a web page.

6. A device comprising:
    a processor;
    operating components operatively connected to the processor;
    a user interface device operatively connected to the processor;
    a menu program adapted to control the user interface device, through the processor, to display a device menu controlling the operating components, wherein the device menu includes device messages, wherein the device menu includes user-selectable menu choices displayed on the user interface device, and wherein the device menu is not compatible with internet protocols;
    a wired or wireless communications device operatively connected to the processor; and
    a menu reproduction program adapted to convert the device menu from being not compatible with internet protocols into a browser-compatible menu compatible with internet protocols, wherein the browser-compatible menu is only generated by the menu reproduction program after each functionality update to the device, wherein each of the functionality updates results in a function set change or a change to the user-selectable menu choices displayed on the user interface device, wherein the menu reproduction program is adapted to convert at least one of the device messages into an alert message, wherein the wired or wireless communications device is adapted to provide the browser-compatible menu to external devices, wherein the alert message contains features causing the external device to present the alert message in a different format relative to presentation formats of other text in the browser-compatible menu, wherein the wired or wireless communications device is adapted to receive external device input from the external devices responding to the browser-compatible menu, and wherein the wired or wireless communications device is adapted to supply the external device input to the processor to operate the operating components.

7. The device according claim 6, wherein the browser-compatible menu has the same content as the device menu.

8. The device according claim 6, wherein the wired or wireless communications device is adapted to establish wired or wireless communications with the external devices, and wherein the browser-compatible menu provided to a first external device of the external devices is generated by the menu reproduction program after the wired or wireless communications device has established wired or wireless communications with the first external device.

9. The device according claim 6, wherein the user interface device includes a display screen and the device menu is displayed on the display screen, and wherein the browser-compatible menu is displayed by the external devices.

10. The device according claim 6, wherein the menu reproduction program is adapted to convert the device menu into the browser-compatible menu in the form of a web page.

11. A method comprising:
controlling operating components by a device operation program executable by a processor;
controlling a user interface device by a menu program executable by the processor to display a device menu, wherein the device menu includes user-selectable menu choices displayed on the user interface device, and wherein the device menu is not compatible with internet protocols;
receiving menu choices to the user interface device in response to the device menu;
controlling the operating components by the device operation program based on the menu choices;
converting the device menu from being not compatible with internet protocols into a browser-compatible menu compatible with internet protocols by a menu reproduction program, wherein the browser-compatible menu is only generated by the menu reproduction program after each functionality update to the device, wherein each of the functionality updates results in a function set change or a change to the user-selectable menu choices displayed on the user interface device;
providing the browser-compatible menu to external devices by a wired or wireless communications device;
receiving external device input from the external devices responding to the browser-compatible menu by the wired or wireless communications device;
supplying, from the wired or wireless communications device, the external device input to the device operation program; and
controlling the operating components by the device operation program based on the external device input.

12. The method according claim 11, wherein the browser-compatible menu has the same content as the device menu.

13. The method according claim 11, further comprising establishing wired or wireless communications with the external devices by the wired or wireless communications device, wherein the browser-compatible menu provided to a first external device of the external devices is generated by the menu reproduction program after the wired or wireless communications device has established wired or wireless communications with the first external device.

14. The method according claim 11, wherein the operating components comprise printing components.

* * * * *